(12) United States Patent
Kawai et al.

(10) Patent No.: US 12,243,558 B2
(45) Date of Patent: Mar. 4, 2025

(54) MAGNETIC DISK DEVICE AND METHOD OF MANAGING PARITY

(71) Applicants: Kabushiki Kaisha Toshiba, Tokyo (JP); Toshiba Electronic Devices & Storage Corporation, Tokyo (JP)

(72) Inventors: Takahiro Kawai, Kanagawa (JP); Tetsuo Kuribayashi, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/464,110

(22) Filed: Sep. 8, 2023

(65) Prior Publication Data

US 2024/0321314 A1    Sep. 26, 2024

(30) Foreign Application Priority Data

Mar. 24, 2023   (JP) .................................. 2023-048599

(51) Int. Cl.
  *G11B 20/18*   (2006.01)
  *G11B 5/012*   (2006.01)
  *G11B 5/09*    (2006.01)

(52) U.S. Cl.
  CPC .......... *G11B 20/1889* (2013.01); *G11B 5/012* (2013.01); *G11B 5/09* (2013.01); *G11B 20/1833* (2013.01)

(58) Field of Classification Search
  None
  See application file for complete search history.

(56) References Cited

U.S. PATENT DOCUMENTS

| | | | |
|---|---|---|---|
| 5,542,065 A * | 7/1996 | Burkes ................. | G06F 3/0647 |
| 5,872,800 A | 2/1999 | Glover et al. | |
| 7,627,725 B2 | 12/2009 | Yoshida | |
| 2008/0222214 A1* | 9/2008 | Tokuda .............. | G06F 11/1076 |
| 2009/0106492 A1* | 4/2009 | Muto .................. | G06F 11/1076 |
| | | | 711/E12.001 |
| 2009/0327802 A1* | 12/2009 | Fukutomi ........... | G06F 11/1068 |
| | | | 714/6.2 |
| 2011/0307658 A1* | 12/2011 | Miwa ..................... | G06F 3/067 |
| | | | 711/E12.019 |
| 2012/0221921 A1* | 8/2012 | Masuo ................. | G06F 11/141 |
| | | | 711/E12.001 |
| 2013/0054907 A1* | 2/2013 | Ikeuchi ............... | G06F 11/2087 |
| | | | 711/159 |
| 2019/0121695 A1* | 4/2019 | Son ..................... | G06F 11/1068 |
| 2019/0129793 A1* | 5/2019 | Choi ................... | G06F 11/1068 |
| 2022/0301590 A1 | 9/2022 | Furuhashi et al. | |
| 2023/0236932 A1* | 7/2023 | Yamamoto .......... | G06F 11/0772 |
| | | | 714/6.24 |

* cited by examiner

*Primary Examiner* — Peter Vincent Agustin
(74) *Attorney, Agent, or Firm* — Kim & Stewart LLP

(57) ABSTRACT

According to one embodiment, a magnetic disk device includes a disk, a storage section, a first determination unit, and a first parity management unit. The first determination unit determines presence or absence of an unexecuted command. The first parity management unit searches the storage section for the first parity area after the first determination unit determines that there is no unexecuted command. The first parity management unit generates the first parity based on the first data in the first data area if the first parity area is detected as the invalid parity area, and writes the first parity to the first parity area.

10 Claims, 7 Drawing Sheets

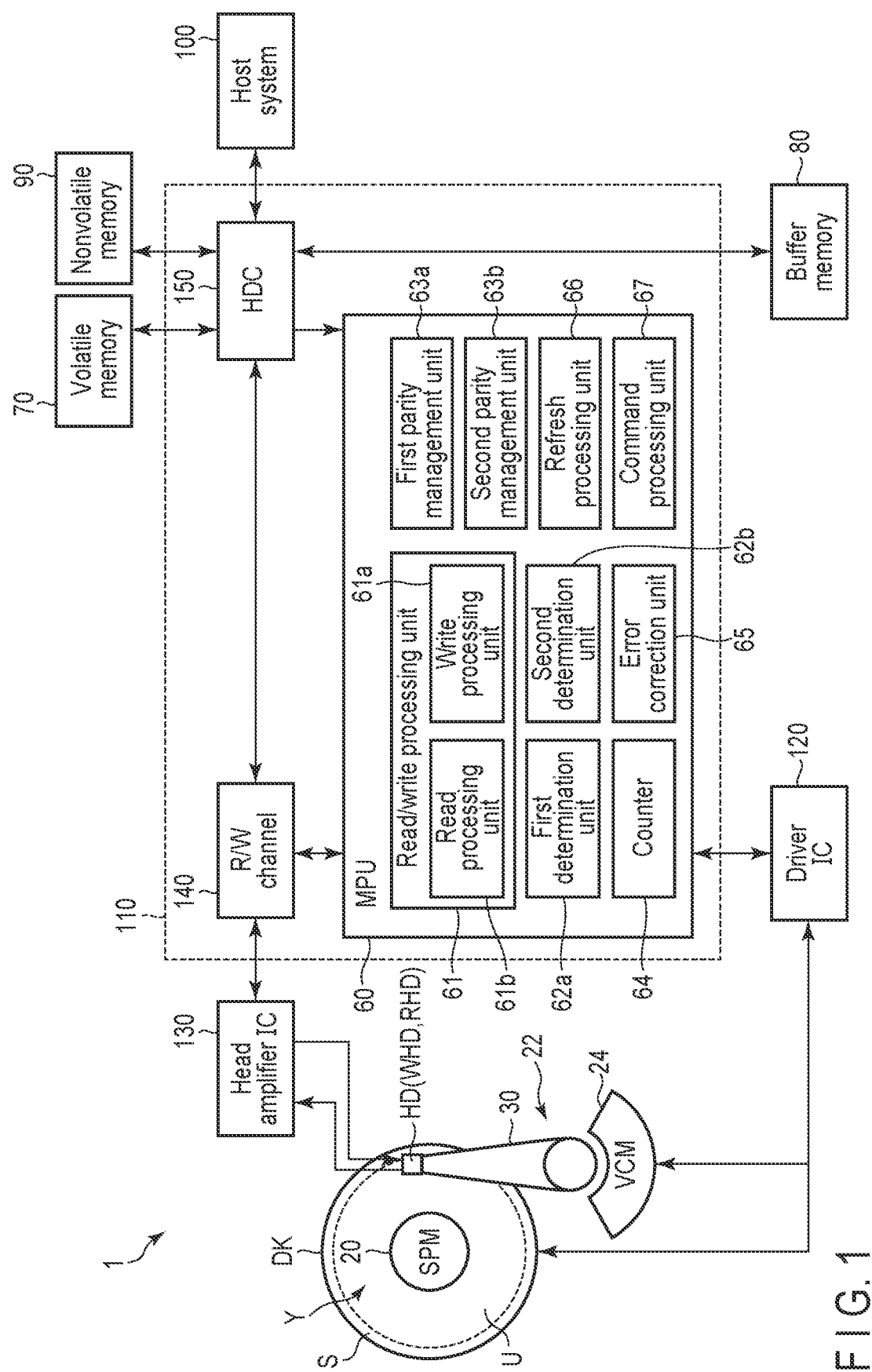
F I G. 1

F.I.G. 3

| Head | Zone | Division | Target for search | History of search | Parity | Number of writes (total) | Reference count |
|---|---|---|---|---|---|---|---|
| HD1 | Zone0 | Div0 | Target | Unsearched | Absence | 450 | 1,500 |
| | | ... | ... | ... | ... | ... | |
| | | Div(m-2) | Target | Unsearched | Absence | 400 | |
| | | Div(m-1) | Target | Searched | Absence | 900 | |
| | | Divm | Target | Unsearched | Absence | 1,350 | |
| | | Div(m+1) | Target | Unsearched | Absence | 1,300 | |
| | | Div(m+2) | Non-target | Searched | Presence | 1,000 | |
| | | ... | ... | ... | ... | ... | |
| | | Divk | Target | Unsearched | Absence | 100 | |
| | ... | ... | ... | ... | ... | ... | ... |
| | Zonex | Div0 | Target | Unsearched | Absence | 50 | 1,000 |
| | | ... | ... | ... | ... | ... | |
| | | Div(m-2) | Target | Unsearched | Absence | 250 | |
| | | Div(m-1) | Target | Unsearched | Absence | 500 | |
| | | Divm | Target | Unsearched | Presence | 950 | |
| | | Div(m+1) | Target | Unsearched | Absence | 600 | |
| | | Div(m+2) | Target | Unsearched | Absence | 300 | |
| | | ... | ... | ... | ... | ... | |
| | | Divk | Target | Unsearched | Absence | 100 | |
| HD2 | Zone0 | Div0 | Target | Unsearched | Absence | 90 | ... |
| | | ... | ... | ... | ... | ... | |

F I G. 6

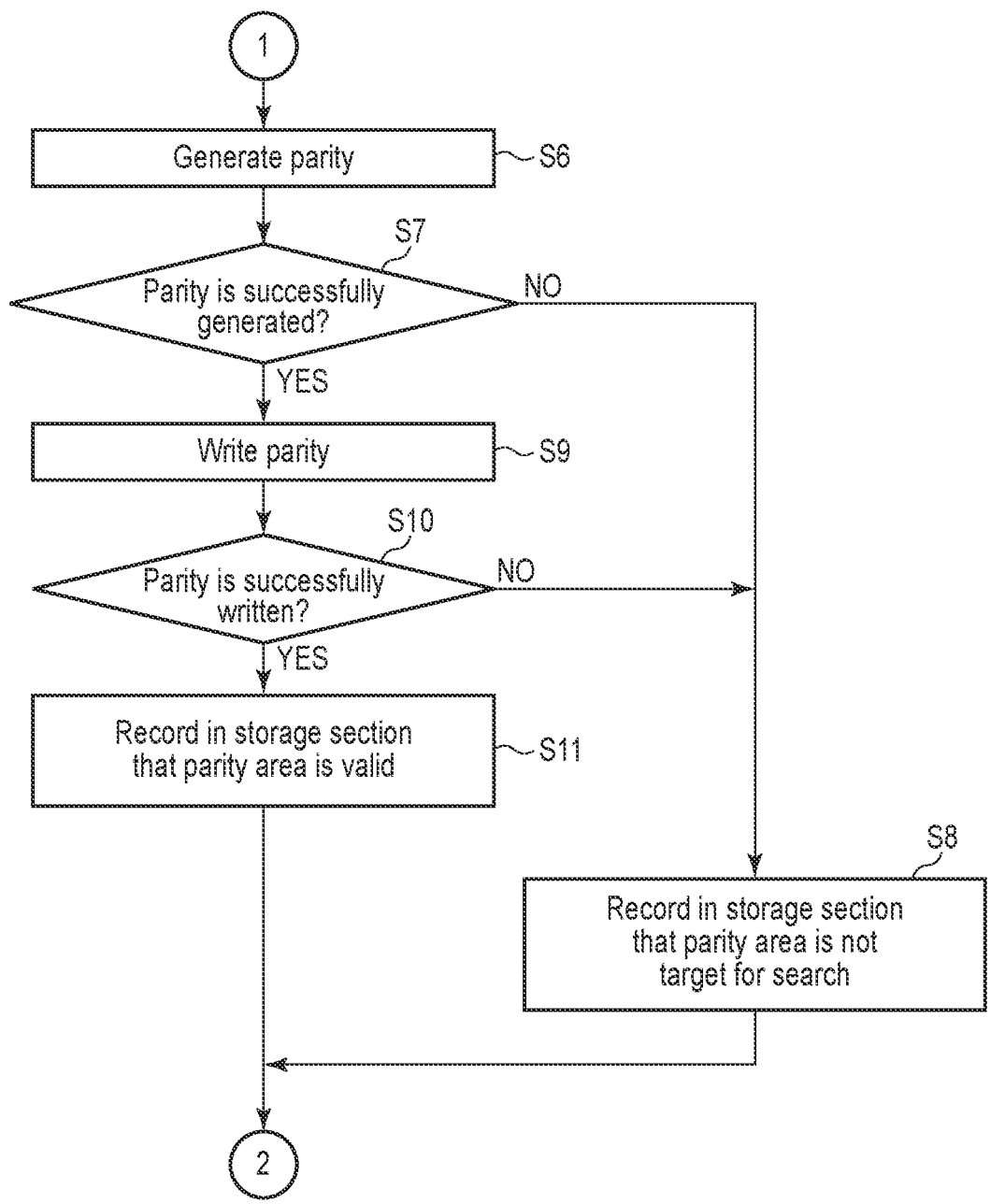
F I G. 8

MAGNETIC DISK DEVICE AND METHOD OF MANAGING PARITY

CROSS-REFERENCE TO RELATED APPLICATIONS

This application is based upon and claims the benefit of priority from Japanese Patent Application No. 2023-048599, filed Mar. 24, 2023, the entire contents of which are incorporated herein by reference.

FIELD

Embodiments described herein relate generally to a magnetic disk device and a method of managing parity.

BACKGROUND

Known magnetic disk devices are a conventional magnetic recording (CMR) magnetic disk device in which data are written to a plurality of tracks at intervals in the radial direction of a disk, a shingled write magnetic recording (SMR) or shingled write recording (SWR) magnetic disk device in which data are overwritten to a plurality of tracks in the radial direction of a disk, and a hybrid recording magnetic disk device which selects conventional magnetic recording or shingled write (magnetic) recording.

BRIEF DESCRIPTION OF THE DRAWINGS

FIG. 1 is a block diagram showing a configuration of a magnetic disk device according to an embodiment.

FIG. 6 is a table showing part of a parity management table stored in a nonvolatile memory of the magnetic disk device and also showing information related to parity, the number of writes, a reference count, and the like.

FIG. 8 is a flowchart illustrating the method of managing parity, following the flowchart of FIG. 7.

DETAILED DESCRIPTION

Figure 2:
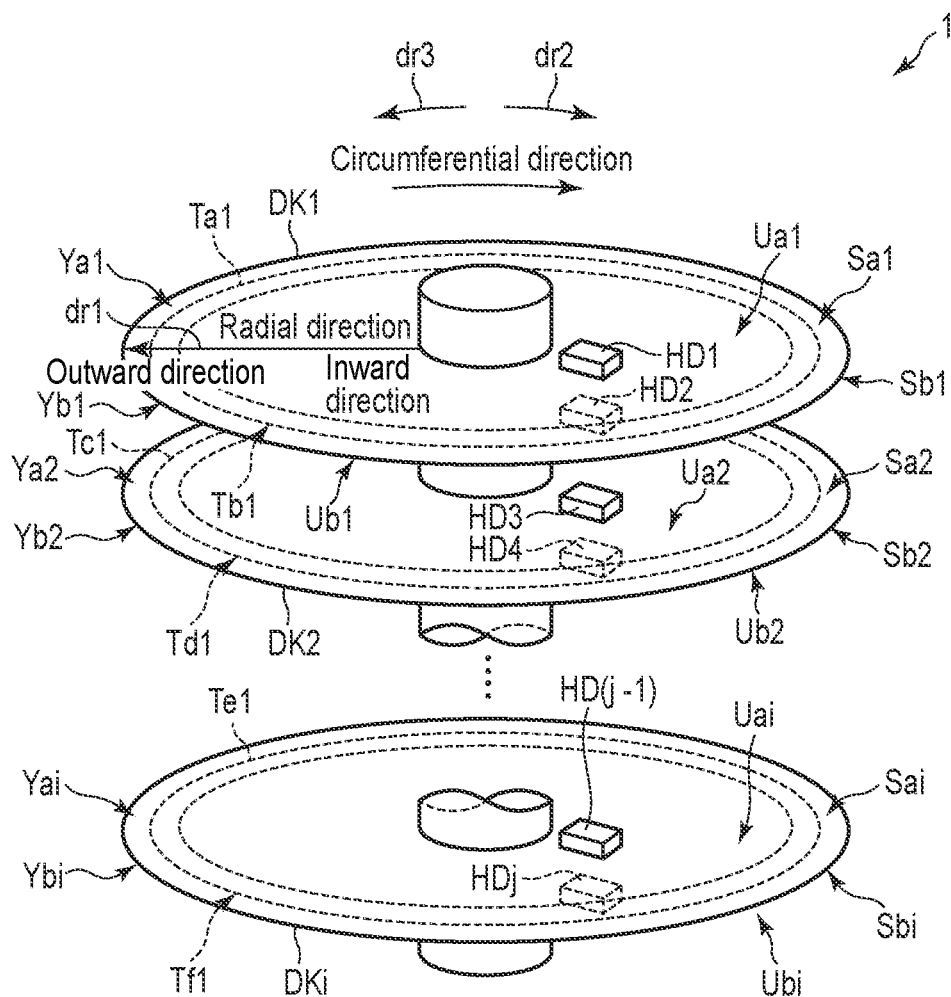
FIG. 2 is a perspective view showing part of the magnetic disk device and also showing a plurality of disks and a plurality of heads.

In general, according to one embodiment, there is provided a magnetic disk device comprising: a disk including a first track, the first track including a first data area in which first data is recorded and a first parity area in which first parity is recorded to reconstruct the first data in the first data area; a storage section which stores information indicating whether the first parity area is a valid parity area in which the first parity is recorded or an invalid parity area in which the first parity is not recorded; a first determination unit which determines presence or absence of an unexecuted command; and a first parity management unit which searches the storage section for the first parity area after the first determination unit determines that there is no unexecuted command, generates the first parity based on the first data in the first data area if the first parity area is detected as the invalid parity area, and writes the first parity to the first parity area.

According to another embodiment, there is provided a method of managing parity applied to a magnetic disk device, the magnetic disk device comprising: a disk including a first track, the first track including a first data area in which first data is recorded and a first parity area in which first parity is recorded to reconstruct the first data in the first data area; and a storage section which stores information indicating whether the first parity area is a valid parity area in which the first parity is recorded or an invalid parity area in which the first parity is not recorded, the method comprising: determining presence or absence of an unexecuted command; and searching the storage section for the first parity area after it is determined that there is no unexecuted command, generating the first parity based on the first data in the first data area if the first parity area is detected as the invalid parity area, and writing the first parity to the first parity area.

A magnetic disk device 1 and a method of managing parity according to an embodiment will be described in detail below with reference to the drawings. First is a description of the configuration of the magnetic disk device 1. FIG. 1 is a block diagram of the configuration of the magnetic disk device 1. In this embodiment, the magnetic disk device 1 is a conventional magnetic recording magnetic disk device.

As shown in FIG. 1, the magnetic disk device 1 includes a plurality, e.g., one to six disks (magnetic disks) DK as recording mediums, a spindle motor (SPM) 20 as a drive motor, a head stack assembly 22, a driver IC 120, a head amplifier integrated circuit (hereinafter referred to as a head amplifier IC or a preamplifier) 130, a volatile memory 70, a buffer memory (buffer) 80, a nonvolatile memory 90, and a system controller 110 that is a one-chip integrated circuit. The magnetic disk device 1 is also connected to a host system (hereinafter referred to simply as a host) 100.

Each of the disks DK is formed to have a diameter of, for example, 95 mm (3.5 inches), and has a recording layer (magnetic recording layer) Y on its either side. In the present embodiment, the magnetic disk device 1 includes one to six disks DK, but the number of disks DK is not limited thereto. The magnetic disk device 1 may also include a single disk DK.

The head stack assembly 22 drives a voice coil motor (hereinafter referred to as a VCM) 24 to move and control a head HD mounted on an arm 30 to a target position on the disk DK.

The disk DK includes an area to which data can be written, and this area is allocated a user data area U that is available to a user and a system area S to which information necessary for system management is written. Assume here that among the tracks of the disk DK, an optional track is a target track, and tracks adjacent to the target track in the radial direction of the disk DK are adjacent tracks. Also, assume that in the target track, an optional one of the sectors arranged in the circumferential direction of the disk DK is a target sector. Also, assume that in the adjacent tracks, sectors adjacent to the target sector in the radial direction of the disk DK among the sectors arranged in the circumferential direction of the disk DK are adjacent sectors.

The head HD records and reproduces information on and from the disk DK. The head HD has a slider as the body and includes a write head WHD and a read head RHD that are mounted on the slider. The write head WHD writes data to the recording layer Y of the disk DK. The read head RHD reads data from a data track of the recording layer Y of the disk DK.

The driver IC 120 controls the driving of the SPM 20 and VCM 24 under the control of the system controller 110 (specifically corresponding to an MPU 60 to be described later). The SPM 20 supports and rotates the disks DK.

The head amplifier IC 130 includes a read amplifier and a write driver. The read amplifier amplifies a read signal that is read from the disk DK and outputs the amplified signal to the system controller 110 (specifically corresponding to a read/write (R/W) channel 140 to be described later). The write driver outputs a write current to the head HD in response to the signal output from the R/W channel 140.

The volatile memory 70 is a semiconductor memory in which stored data is lost if power supply is cut off. The volatile memory 70 stores data and the like required for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like transmitted and received between the magnetic disk device 1 and the host 100. Note that the buffer memory 80 may be formed integrally with the volatile memory 70 as one unit. The buffer memory 80 is a DRAM, a static random access memory (SRAM), SDRAM, a ferroelectric random access memory (FeRAM), a magnetoresistive random access memory (MRAM), or the like.

The nonvolatile memory 90 is a semiconductor memory that records data stored even if power supply is cut off. The nonvolatile memory 90 is, for example, a NOR or NAND flash read only memory (FROM).

In the present embodiment, the nonvolatile memory 90 functions as a storage section that stores information related to parity, the number of writes, a reference count, and the like. Note that the storage section is not limited to the nonvolatile memory 90, but has only to be a recording section in the magnetic disk device 1, such as a system area S.

The nonvolatile memory 90 (storage section) can store information indicating whether the parity area of each track in the user data area U of the recording layer Y of the disk DK is valid or invalid. The valid parity area means a parity area in which parity that is usable to reconstruct data in a data area of the same track is recorded. The invalid parity area means a parity area in which no parity that is usable to reconstruct data in a data area of the same track is recorded.

The system controller (controller) 110 is implemented using, for example, a large scale integrated circuit (LSI) called a system-on-a-chip (SoC) in which a plurality of elements are integrated in a single chip. The system controller 110 includes a read/write (R/W) channel 140, a hard disk controller (HDC) 150 and a microprocessor (MPU) 60. The system controller 110 is electrically connected to the driver IC 120, the head amplifier IC 130, the volatile memory 70, the buffer memory 80, the nonvolatile memory 90 and the host 100.

The R/W channel 140 processes a signal of read data transferred from the disk DK to the host 100 and write data transferred from the host 100 in response to an instruction from the MPU 60 to be described later. The R/W channel 140 has a circuit or function for modulating write data. The R/W channel 140 also has a circuit or function for measuring the quality of signal of the read data. The R/W channel 140 is electrically connected to the head amplifier IC 130, the HDC 150, the MPU 60, and the like.

The HDC 150 controls data transfer between the host 100 and the R/W channel 140 in response to an instruction from the MPU 60, which will be described later. The HDC 150 is electrically connected to the R/W channel 140, the MPU 60, the volatile memory 70, the buffer memory 80, the nonvolatile memory 90, and the like.

The MPU 60 is a control unit, or a main controller which controls each unit of the magnetic disk device 1. The MPU 60 controls the VCM 24 via the driver IC 120 to perform servo control for positioning the head HD. The MPU 60 controls the operation of writing data to the disk DK and selects a storage location of the write data transferred from the host 100. In addition, the MPU 60 controls the operation of reading data from the disk DK and also controls a process of read data transferred from the disk DK to the host 100. The MPU 60 is connected to each unit of the magnetic disk device 1. The MPU 60 is electrically connected to the driver IC 120, the R/W channel 140, the HDC 150, and the like.

The MPU 60 includes a read/write processing unit 61, a first determination unit 62*a*, a second determination unit 62*b*, a first parity management unit 63*a*, a second parity management unit 63*b*, a counter 64, an error correction unit 65, a refresh processing unit 66 and a command processing unit 67. The MPU 60 executes the process of each of these units 61, 62*a*, 62*b*, 63*a*, 63*b*, 64, 65, 66 and 67 on the firmware. Note that the MPU 60 may include these units as circuits.

The read/write processing unit 61 includes a write processing unit 61*a* and a read processing unit 61*b*. In response to a command from the host 100, the write processing unit 61*a* controls a process of writing data to the recording layer Y of the disk DK, and the read processing unit 61*b* controls a process of reading data from the recording layer Y of the disk DK. The read/write processing unit 61 controls the VCM 24 via the driver IC 120, set the head HD at a target position (a predetermined radial position) on the disk DK, and performs a read process or a write process.

The first determination unit 62*a* can determine presence or absence of a command received from the host 100 and determine presence or absence of an unexecuted command. A variety of commands including write and read commands are known as commands received from the host 100. The first determination unit 62*a* can periodically determine presence or absence of an unexecuted command after the first parity management unit 63*a* starts to search the nonvolatile memory 90 (storage section) for a parity area.

The first parity management unit 63*a* can search the nonvolatile memory 90 (storage section) for a parity area after the first determination unit 62*a* determines that there is no unexecuted command. For example, after the first determination unit 62*a* continues to determine that there is no unexecuted command for a specific period of time, the first parity management unit 63*a* can start to search the nonvolatile memory 90 for a parity area.

Figure 4:
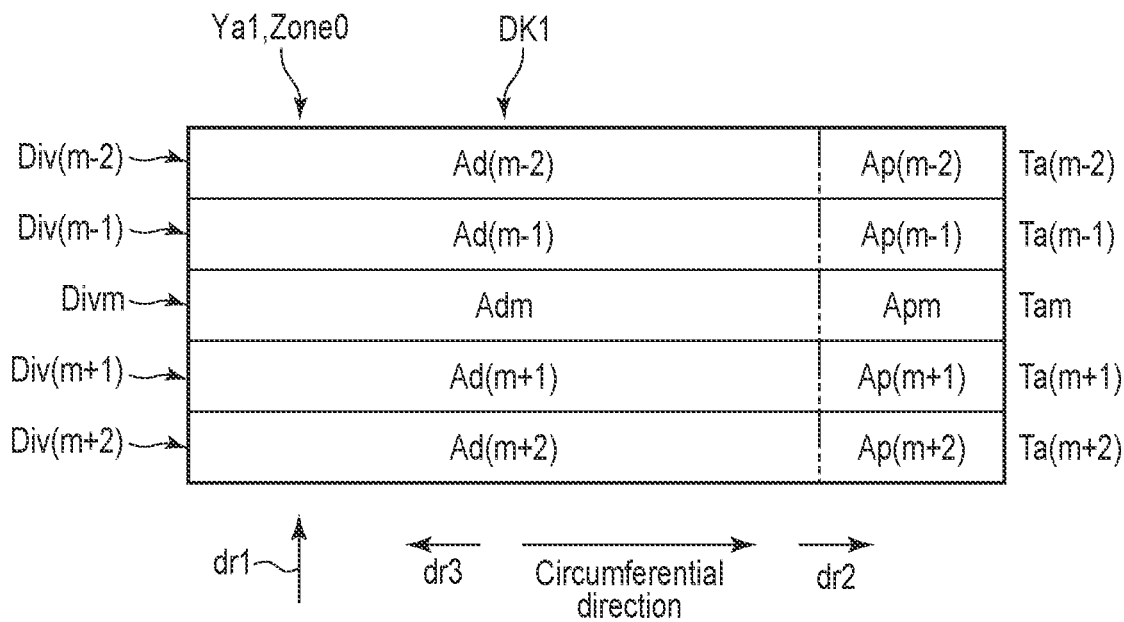
FIG. 4 is a diagram illustrating a plurality of tracks continuing in a radial direction in the magnetic disk device.

As shown in FIGS. 1 and 4, if the first parity management unit 63*a* detects a parity area (first parity area) Apm which is an invalid parity area, it can generate a first parity based on first data of a data area (first data area) Adm of a track (first track) Tam including the parity area Apm and write the first parity to the parity area Apm. The first parity management unit 63*a* can perform an exclusive OR (XOR) operation on the first data of the data area Adm to generate a first parity for error correction.

For example, after the first parity management unit 63*a* starts to search the nonvolatile memory 90 for a parity area Ap, if the first determination unit 62*a* determines that there is an unexecuted command, the first parity management unit 63*a* can interrupt the search of the nonvolatile memory 90 for the parity area Ap.

If the first parity management unit 63*a* succeeds in generating a first parity and succeeds in writing the first parity to the parity area Apm, it can update the information in the nonvolatile memory 90 to information indicating that the parity area Apm is a valid one.

On the other hand, if the first parity management unit 63*a* fails to generate the first parity or fails to write the first parity to the parity area Apm, it can update the information in the nonvolatile memory 90 to information indicating that the parity area Apm is not a target for search. That is, the first parity management unit 63*a* can exclude the parity area Apm from the target for search.

The second parity management unit 63*b* can write a parity to the parity area Ap. For example, after the first parity management unit 63*a* updates the information in the nonvolatile memory 90 (storage section) to information indicating that the parity area Apm is not a target for search, the second parity management unit 63*b* can write a parity to the parity area Apm. If the second parity management unit 63*b* succeeds in writing a parity to the parity area Apm, it can update the information in the nonvolatile memory 90 to information indicating that the parity area Apm is a target for search. That is, the second parity management unit 63*b* can return the parity area Apm, which was not a target for search, to the target for search.

For example, after the first parity management unit 63*a* updates the information in the nonvolatile memory 90 to information indicating that the parity area Apm is not a target for search, if the write processing unit 61*a* writes second data to the data area Adm in response to the received write command, the second parity management unit 63*b* can generate a second parity based on the second data and write the second parity to the parity area Apm.

For example, if the write processing unit 61*a* sequentially writes the second data to a range of one or more tracks (data area Adm or more), it can sequentially write the second data to the entire data area Adm.

If the second parity management unit 63*b* succeeds in writing the second parity to the parity area Apm, it can update the information in the nonvolatile memory 90 to information indicating that the parity area Apm is a target for search.

As described above, for example, in the case where the write processing unit 61*a* sequentially writes data to a range of one or more tracks including the data area Adm, the second parity management unit 63*b* can write parity to the parity area Apm.

Figure 5:
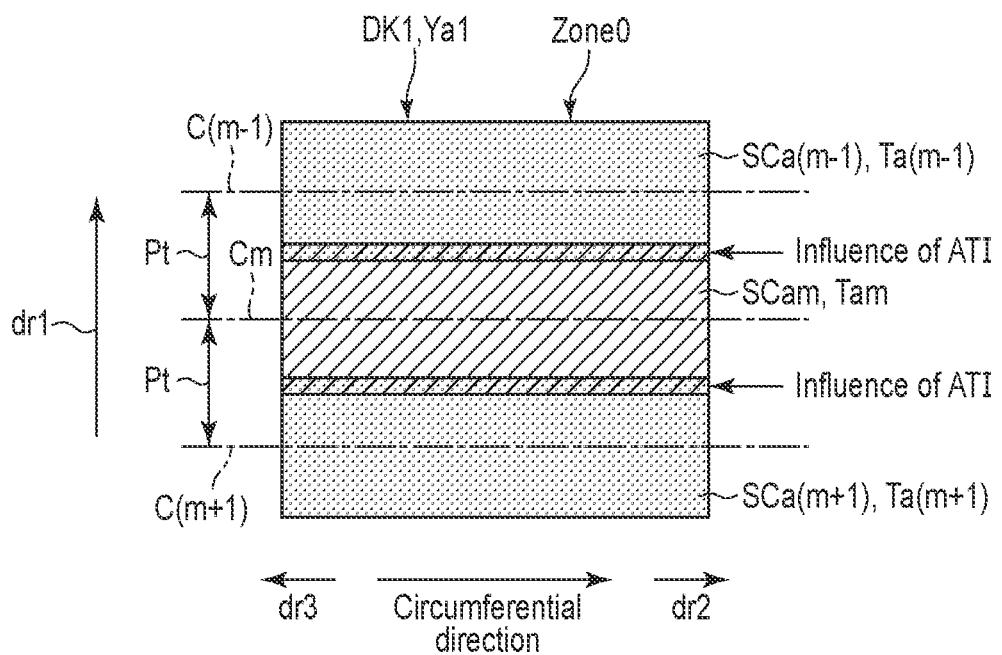
FIG. 5 is a schematic diagram showing three sectors arranged in the radial direction of the magnetic disk device and illustrating the influence of ATI on adjacent sectors.

As shown in FIGS. 1 and 5, the counter 64 can count the number of writes to the disk DK. For example, when data is written to a predetermined sector SCam of the disk DK1, the counter 64 can count the number of writes of sectors SCa(m−1) and SCa(m+1) adjacent to a predetermined sector SCam in the radial direction dr1. Then, the counter 64 can update the total number of writes per sector SCa in the nonvolatile memory 90 (storage section).

As shown in FIGS. 1 and 6, the nonvolatile memory (storage section) 90 further stores a reference count (first reference count). The second determination unit 62*b* can determine whether the total number of writes exceeding the reference count is recorded in the nonvolatile memory 90.

As shown in FIGS. 1 and 5, the refresh processing unit 66 can detect a sector with the total number of writes exceeding the reference count, based on information stored in the nonvolatile memory 90 (storage section). For example, if the total number of writes for the sector SCam exceeds the reference count, the refresh processing unit 66 can perform a refresh process of reading data (target data) of the sector (target sector) SCam and rewriting the data (target data) to the sector SCam. Then, the refresh processing unit 66 can further reset the total number of writes for the sector SCam recorded in the nonvolatile memory 90.

As shown in FIGS. 1, 4 and 6, when the first parity management unit 63*a* detects a parity area Ap from the nonvolatile memory 90 (storage section), it can preferentially search for a parity area Ap of track Ta that is ready for a refresh process.

For example, when the first parity management unit 63*a* detects a parity area Ap from the nonvolatile memory 90, it can determine whether a parity area Ap of track Ta in which a value obtained by dividing the total number of writes by the reference count is the largest is invalid.

If the first parity management unit 63*a* determines that the above parity area Ap is valid, it can further determine whether a parity area Ap of track Ta in which a value obtained by dividing the total number of writes by the reference count is the next largest is invalid.

If the first parity management unit 63*a* determines that the above parity area Ap is invalid, it can detect the invalid parity area Ap preferentially.

Within the range shown in FIG. 6, first, when the first parity management unit 63*a* detects a parity area Ap from the nonvolatile memory 90, it determines whether a parity area Ap of track Ta (a track located in division area Divm of zone area Zonex of the disk DK1) in which a value (0.95) obtained by dividing the total number of writes (950) by the reference count (1000) is the largest is invalid.

In the example of FIG. 6, the maximum value obtained by dividing the total number of writes by the reference count is 0.95, which is 1.0 or less. However, the maximum value is not limited to that in the example of FIG. 6, but may exceed 1.0.

Since the first parity management unit 63*a* determines that the above parity area Ap is valid, it can further determine whether a parity area Ap of track Ta (a track located in division area Divm of zone area Zone0 of the disk DK1) in which a value (0.9) obtained by dividing the total number of writes (1350) by the reference count (1500) is the next largest value is invalid.

Since the first parity management unit 63*a* determines that the above parity area Ap is invalid, the first parity management unit 63*a* can detect the invalid parity area Ap preferentially.

As shown in FIG. 1, the command processing unit 67 can process a command received from the host 100. For example, the command processing unit 67 can process an unexecuted command in preference to search by the first parity management unit 63*a*.

As shown in FIGS. 1 and 4, the error correction unit 65 can recover data of the data area Ad of the disk DK. For example, if the read processing unit 61*b* detects that a read error has occurred in the data area Adm of a first recording layer Ya1 of the disk DK1, the error correction unit 65 can recover first data, based on first data of the data area Adm and a first parity of the parity area Apm, and write the recovered first data to the data area Adm.

FIG. 2 is a perspective view showing part of the magnetic disk device 1 and also showing a plurality of disks DK and a plurality of heads HD.

As shown in FIG. 2, the circumferential direction in which the disks DK rotate will be referred to as a rotation direction dr3. Note that in the example shown in FIG. 2, the rotation direction is counterclockwise, but may be reversed (clockwise). In addition, the traveling direction dr2 of the heads HD to the disks DK is opposite to the rotation direction dr3. The traveling direction dr2 is a circumferential direction in which the heads HD sequentially write and read data to and from the disks DK, that is, a circumferential direction in which the heads HD travel to the disks DK. The radial direction dr1 of the disks DK in which the heads HD move toward the outer circumferences of the disks DK will be referred to as an outward direction (outside), and a direction opposite to the outward direction will be referred to as an inward direction (inside).

The magnetic disk device 1 includes i disks DK1 to DKi and j heads HD1 to HDj. In the present embodiment, the number of heads HD is twice the number of disks DK (j=2i).

The disks DK1 to DKi are coaxially arranged and stacked one on another at intervals. The diameters of the disks DK1 to DKi are the same. In the present specification, terms such as "same", "identical", "coincident" and "equal" not only imply the exact same meaning but also have substantially the same meaning. Note that the diameters of the disks DK1 to DKi may be different from each other.

Each of the disks DK has a recording layer Y on both sides. For example, the disk DK1 has a first recording layer Ya1 and a second recording layer Yb1 opposed to the first recording layer Ya1. The disk DK2 has a first recording layer Ya2 and a second recording layer Yb2 opposed to the first recording layer Ya2. The disk DKi has a first recording layer Yai and a second recording layer Ybi opposed to the first recording layer Yai. Each of the first recording layers Ya may be referred to as a front surface or a recording surface. Each of the second recording layers Yb may be referred to as a back surface or a recording surface.

As described above, the magnetic disk device 1 of the present embodiment is of a conventional magnetic recording magnetic disk device. Thus, the user data area U of each of the recording layers Y is a conventional magnetic recording area. In this type of magnetic disk device, data is allowed to be randomly written to the user data area U, that is, conventional magnetic recording is allowed.

Each of the recording layers Y includes a user data area U and a system area S. The first recording layer Ya1 includes a user data area Ua1 and a system area Sa1. The second recording layer Yb1 includes a user data area Ub1 and a system area Sb1. The first recording layer Ya2 includes a user data area Ua2 and a system area Sa2. The second recording layer Yb2 includes a user data area Ub2 and a system area Sb2. The first recording layer Yai includes a user data area Uai and a system area Sai. The second recording layer Ybi includes a user data area Ubi and a system area Sbi.

In the user data area Ua1 (first recording layer Ya1), a track sandwiched between doubled dashed lines in the figure will be referred to as a track Ta1. In the user data area Ub1 (second recording layer Yb1), a track located opposite to the track Ta1 will be referred to as a track Tb1.

In the user data area Ua2 (first recording layer Ya2), a track sandwiched between doubled dashed lines in the figure will be referred to as a track Tc1. In the user data area Ub2 (second recording layer Yb2), a track located opposite to the track Tc1 will be referred to as a track Td1.

In the user data area Uai (first recording layer Yai), a track sandwiched between doubled dashed lines in the figure will be referred to as a track Te1. In the user data area Ubi (second recording layer Ybi), a track located opposite to the track Te1 will be referred to as a track Tf1.

In the present embodiment, the tracks Ta1, Tb1, Tc1, Td1, Te1 and Tf1 are located on the same cylinder.

The heads HD are opposed to the disks DK. In this embodiment, one head HD is opposed to the recording layer Y of each of the disks DK. For example, the head HD1 is opposed to the first recording layer Ya1 of the disk DK1 to write data to the first recording layer Ya1 and read data from the first recording layer Ya1. The head HD2 is opposed to the second recording layer Yb1 of the disk DK1 to write data to the second recording layer Yb1 and read data from the second recording layer Yb1. The head HD3 is opposed to the first recording layer Ya2 of the disk DK2 to write data to the first recording layer Ya2 and read data from the first recording layer Ya2. The head HD4 is opposed to the second recording layer Yb2 of the disk DK2 to write data to the second recording layer Yb2 and read data from the second recording layer Yb2. The head HDj-1 is opposed to the first recording layer Yai of the disk DKi to write data to the first recording layer Yai and read data from the first recording layer Yai. The head HDj is opposed to the second recording layer Ybi of the disk DKi to write data to the second recording layer Ybi and read data from the second recording layer Ybi.

Figure 3:
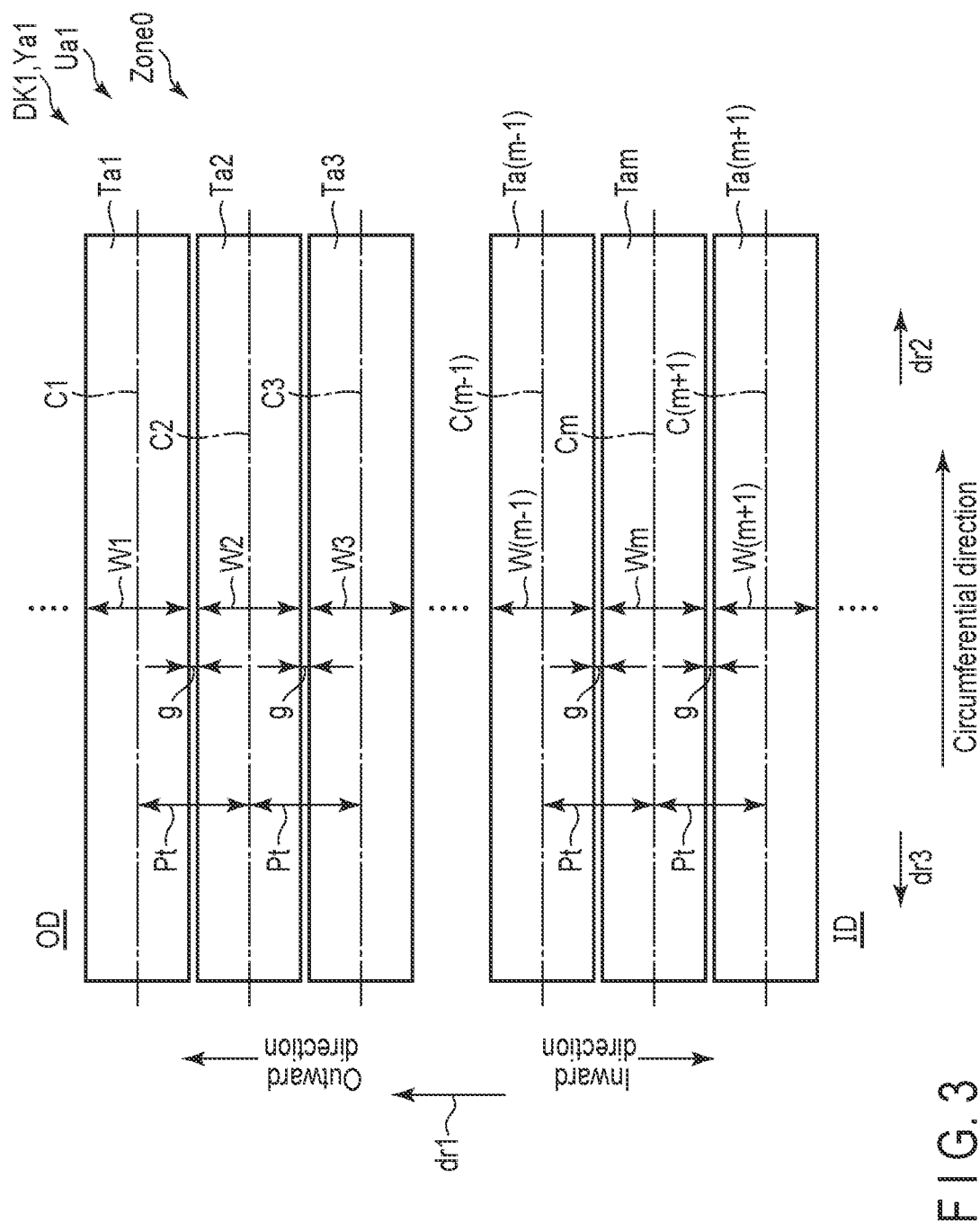
FIG. 3 is a schematic diagram showing some of tracks on which conventional magnetic recording is performed.

FIG. 3 is a schematic diagram showing some of the tracks on which conventional magnetic recording is performed.

As shown in FIG. 3, the zone area Zone0 of the first recording layer Ya1 of the disk DK1 includes, for example, tracks Ta1, Ta2, Ta3, . . . , Ta(m−1), Tam, Ta(m+1) which are arranged in the radial direction dr1. In this figure, the track Ta1 is located on an outermost circumference OD side of the disk DK1, and the track Ta(m+1) is located on an innermost circumference ID side of the disk DK1.

The track Ta1 has a track width W1 in the radial direction dr1 and a track center C1 in its center in the radial direction dr1. Like the track Ta1, the track Ta2 has a track width W2 and a track center C2, the track Ta3 has a track width W3 and a track center C3, the track Ta(m−1) has a track width W(m−1) and a track center C(m−1), the track Tam has a track width Wm and a track center Cm, and the track Ta(m+1) has a track width W(m+1) and a track center C(m+1). The track widths W1 to W(m+1) are identical, but may be different from each other.

The tracks Ta1 to Ta(m+1) are arranged with a pitch (a conventional magnetic recording track pitch) Pt in the radial direction dr1. For example, the track centers C1 and C2 are separated with a pitch Pt in the radial direction dr1, and the track centers C2 and C3 are also separated with a pitch Pt in the radial direction dr1. In addition, the track centers C(m−1) and Cm are separated with a pitch Pt in the radial direction dr1, and the track centers Cm and C(m+1) are separated with a pitch Pt in the radial direction dr1. Note that the tracks Ta1 to Ta(m+1) may be arranged with different pitches in the radial direction dr1.

The conventional magnetic recording magnetic disk device can be increased in density by narrowing the pitch Pt to increase the storage capacity.

In the example shown in FIG. 3, the tracks Ta1 to Ta(m+1) are arranged with a gap g in the radial direction dr1. For example, the tracks Ta1 and Ta2 are separated with a gap g in the radial direction dr1, and the tracks Ta2 and Ta3 are also separated with a gap g in the radial direction dr1. In addition, the tracks Ta(m−1) and Tam are separated with a gap g in the radial direction dr1, and the tracks Tam and Ta(m+1) are separated with a gap g in the radial direction dr1. Note that the tracks Ta1 to Ta(m+1) may be arranged with different gaps.

In FIGS. 3 and 4, each track Ta is shown in the form of a rectangle for convenience of description, but actually it is curved along the circumferential direction. Each track may be formed in a wave shape extending in the circumferential direction while varying in the radial direction dr1.

In performing a conventional write process, the write processing unit 61a positions the head HD1 at the track center C1 to write data to the track Ta1, positions the head HD1 at the track center C2 to write data to the track Ta2, positions the head HD1 at the track center C3 to write data to the track Ta3, positions the head HD1 at the track center C(m−1) to write data to the track Ta(m−1), positions the head HD1 at the track center Cm to write data to the track Tam, positions the head HD1 at the track center C(m+1) to write data to the track Ta(m+1).

In the example shown in FIG. 3, the write processing unit 61a may sequentially perform a write process on the tracks Ta1 to Ta(m+1) or may randomly perform a write process on a predetermined sector of each of the tracks Ta1 to Ta(m+1).

FIG. 4 is a diagram illustrating a plurality of tracks Ta continuing in the radial direction dr1 in the magnetic disk device 1. This figure shows five tracks Ta in the zone area Zone0 of the first recording layer Ya1 of the disk DK1.

As shown in FIG. 4, the zone area Zone0 of the first recording layer Ya1 of the disk DK1 includes a plurality of tracks Ta, such as tracks Ta(m−2), Ta(m−1), Tam, Ta(m+1) and Ta(m+2). For example, the track Tam is a track located in the division area Divm of the zone area Zone0 of the first recording layer Ya1 of the disk DK1.

Each of the tracks Ta includes a data area Ad and a parity area Ap. The data area Ad is an area in which data is recorded. The parity area Ap is an area in which parity is recorded to reconstruct data of the data area Ad of the same track Ta. For example, the parity area Apm is an area in which parity is recorded to reconstruct data of the data area Adm.

FIG. 5 is a schematic diagram showing three sectors SCa(m−1), SCam and SCa(m+1) arranged in the radial direction dr1 of the magnetic disk device 1 and illustrating the influence of adjacent track interference (ATI) on adjacent sectors.

In FIG. 5, an area in which a data write process has been performed for the sector SCam is hatched, and an area in which a data write process has been performed for the sector SCa(m−1) and an area in which a data write process has been performed for the sector SCa(m+1) are dotted.

As shown in FIG. 5, the track Tam includes the sector SCam. The track Ta(m−1) includes the sector SCa(m−1) adjacent to the sector SCam in the radial direction dr1. The track Ta(m+1) includes the sector SCa(m+1) adjacent to the sector SCam in the radial direction dr1.

Hereinafter, the track Tam will be referred to as a target track Tam, the track Ta(m−1) will be referred to as an adjacent track Ta(m−1), and the track Ta(m+1) will be referred to as an adjacent track Ta(m+1). The adjacent track Ta(m+1) is an inside adjacent track located inside the target track Tam. The adjacent track Ta(m−1) is an outside adjacent track located outside the target track Tam.

In addition, the sector SCam will be referred to as a target sector SCam, the sector SCa(m−1) will be referred to as an adjacent sector SCa(m−1), and the sector SCa(m+1) will be referred to as an adjacent sector SCa(m+1). The adjacent sector SCa(m+1) is an inside adjacent sector adjacent to the target sector SCam in the radial direction dr1. The adjacent sector SCa(m−1) is an outside adjacent sector adjacent to the target sector SCam in the radial direction dr1.

If data is written to the adjacent sector SCa(m−1) or if data is written to the adjacent sector SCa(m+1), the data in the target sector SCam is influenced by ATI.

In addition, if data is written to the adjacent sectors SCa(m−1) and SCa(m+1) many times, data is also written (overwritten) in the vicinity of each of a boundary between the target sector SCam and the adjacent sector SCa(m−1), and a boundary between the target sector SCam and the adjacent sector SCa(m+1) each time data is written. If the number of writes to the adjacent sectors SCa(m−1) and SCa(m+1) increases, the original target data of the target sector SCam may not be read.

From the above, in the magnetic disk device 1, when the total number of writes to adjacent sectors SCa(m−1) and SCa(m+1) exceeds the reference number, the refresh processing unit 66 performs a refresh process called an ATI refresh operation in consideration of the ATI influence. The process of refreshing the target sector SCam is a process of reading target data of the target sector SCam and rewriting the read target data to the target sector SCam. Thus, a situation in which the original target data of the target sector SCam cannot be read due to the ATI influence, can be avoided in advance.

When data is written to the adjacent sector SCa(m−1), the counter 64 can count the number of writes to the target sector SCam as "h" times, where h is equal to 1. Alternatively, the counter 64 may count the number of writes while adjusting h to a value other than "1" or "1" in consideration of the magnitude of the ATI influence. For example, if the counter 64 determines that a write process that causes the ATI influence to be greater than usual has been performed, it can count the number of writes as a value greater than "1". If the counter 64 determines that a write process that causes the ATI influence to be smaller than usual has been performed, it can count the number of writes as a value less than "1".

Next is an illustration of a parity management table stored in the nonvolatile memory 90 (storage section). FIG. 6 is a table showing part of the parity management table stored in the nonvolatile memory 90 of the magnetic disk device 1 and also showing information related to parity, the total number of writes, the reference count, and the like.

As shown in FIG. 6, the parity management table can manage a search target, a search history, parity, and the total number of writes for each track.

The "search target" indicates whether the parity area Ap of the track Ta is a search target or not. For example, the first parity management unit 63a can exclude the parity area Ap of the track Ta located in the division area Div(m+2) of the zone area Zone0 of the disk DK1 (or, head HD1) from the search target.

The "search history" indicates whether the first parity management unit 63a has searched or has not searched each track Ta for the parity area Ap.

The "parity" indicates whether the parity area Ap of each track Ta is valid or invalid. For example, if new data is written to the data area Ad of the track Ta located in the division area Divm of the zone area Zonex of the disk DK1, the first parity management unit 63a can update the "parity" in the division area Divm of the zone area Zonex of the disk DK1 from validity to invalidity.

The "(total) number of writes" indicates the maximum total number of writes to each track Ta. Note that each track Ta has the total number of writes for each sector SCa.

The "reference count" is the number of writes allowed to count writes. In the present embodiment, the "reference count" is set for each zone area Zone. However, the "reference count" need not be set for each zone area Zone. For example, the "reference count" may be the same for all the tracks Ta of disk DK1.

Alternatively, if the recording layer Y is divided into a plurality of divided areas in the circumferential direction, the "reference count" may be set for each of the divided areas.

Alternatively, if the recording layer Y is divided into a plurality of divided areas in the radial direction dr1 and the circumferential direction, the "reference count" may be set for each of the divided areas.

As can be seen from FIG. 6, the track Ta with the largest value obtained by dividing the total number of writes by the reference count is a track located in the division area Divm of the zone area Zonex of the disk DK1. The track Ta whose value is next close to 1 is a track located in the division area Divm of the zone area Zone0 of the disk DK1.

Since the nonvolatile memory 90 can store the parity management table and the parity management table is updated, the MPU 60 can make determination and perform processes based on the parity management table.

The magnetic disk device 1 of the present embodiment is configured as described above.

Figure 7:
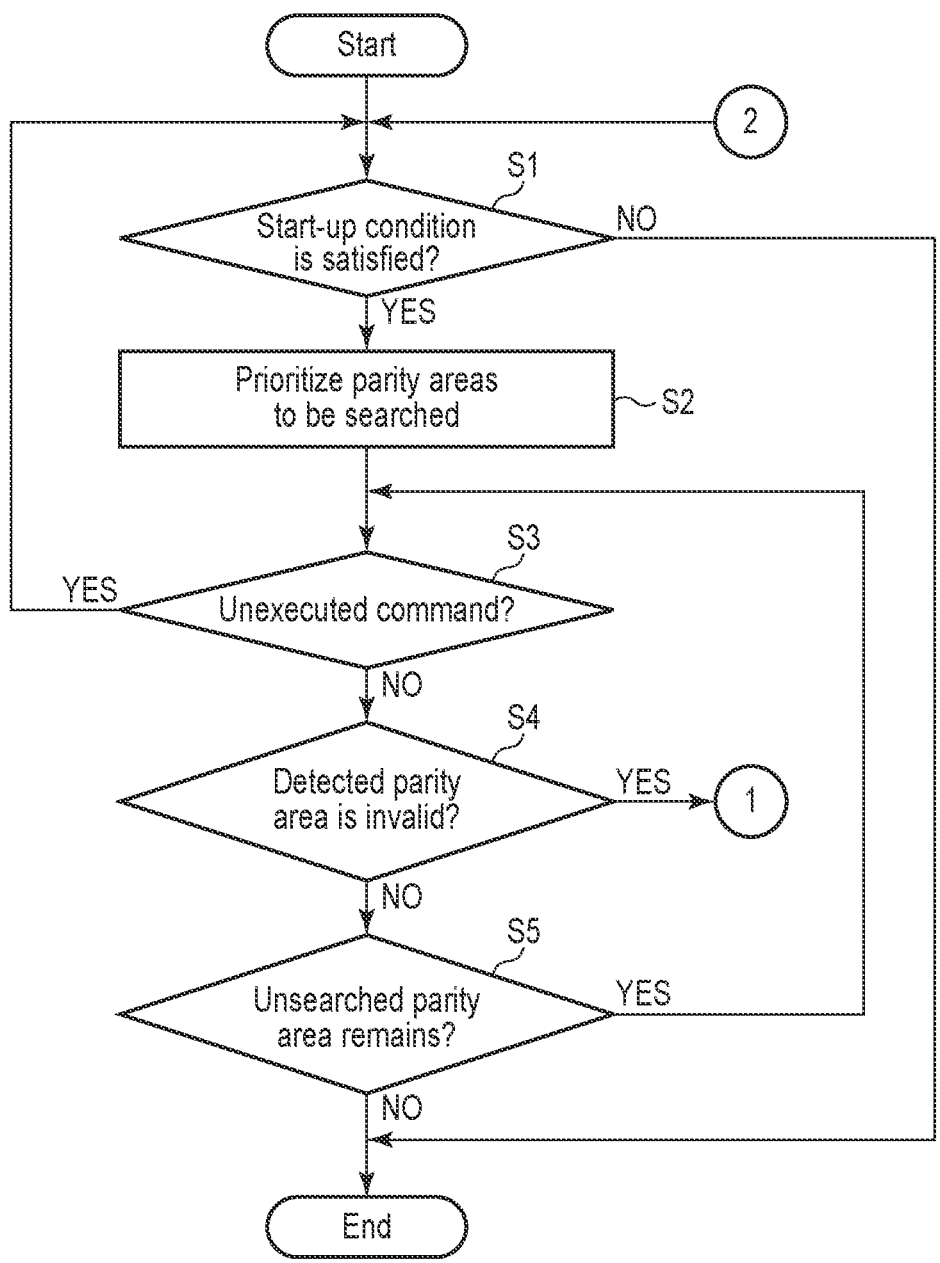
FIG. 7 is a flowchart illustrating a method of managing parity applied to the magnetic disk device.

Next is a description of the method of managing parity. FIGS. 7 and 8 are flowcharts illustrating a method of managing parity applied to the magnetic disk device 1.

If a method of managing parity is started as shown in FIGS. 7, 1 and 6, the MPU 60 first determines whether the start-up condition is satisfied in step S1. The start-up condition is that the first determination unit 62a continues to determine for a specific period of time that there is no unexecuted command. Note that the start-up is repeated until the end of search by the first parity management unit 63a. If the MPU 60 determines that the start-up condition is not satisfied (step S1), the method of managing parity is terminated.

If the MPU 60 determines that the start-up condition is satisfied (step S1), the process moves to step S2, in which the first parity management unit 63a prioritizes a plurality of parity areas Ap to be searched. For example, the first parity management unit 63a preferentially searches for the parity area Ap of a track Ta that is ready for a refresh process. Parity can preferentially be written to the parity area Ap of a track Ta where the next read error is likely to occur, and the quality of the magnetic disk device 1 can be improved with efficiency.

Then, in step S3, the command processing unit 67 determines whether there is an unexecuted command. If the command processing unit 67 determines that there is an unexecuted command (step S3), the process moves to step S1. The command processing unit 67 can thus execute an unexecuted command in preference to the search by the first parity management unit 63a.

If the command processing unit 67 determines that there is no unexecuted command (step S3), the process moves to step S4. The first parity management unit 63a can search for an invalid parity area in the background process. Parity can thus be generated and written without adversely influencing the performance of the magnetic disk device 1.

In step S4, the first parity management unit 63a determines whether the detected parity area Ap is invalid. If the parity area Ap is invalid (step S4), the process moves to step S6.

If the parity area Ap is not invalid (step S4), that is, if the parity area Ap is valid, the process moves to step S5, in which the first parity management unit 63a determines whether there is any remaining parity area Ap that has not been searched.

If there is any remaining parity area Ap that has not been searched (step S5), the process moves to step S3.

If there is no remaining parity area Ap that has not been searched (step S5), the method of managing parity is terminated.

As shown in FIGS. 8, 1 and 6, in step S6, the first parity management unit 63a generates parity based on data in the data area Ad of the same track Ta as the detected invalid parity area Ap. Then, in step S7, the first parity management unit 63a determines whether the first parity management unit 63a has succeeded in generating parity.

If the first parity management unit 63a has failed to generate parity (step S7), the process moves to step S8, in which the first parity management unit 63a records in the nonvolatile memory 90 (storage section) that the detected invalid parity area Ap is not a target for search. That is, the first parity management unit 63a records the address of the first sector (front sector) of the detected invalid parity area Ap in the nonvolatile memory 90, and excludes the detected invalid parity area Ap from the target for search. In the present embodiment, the data access method is CHS, but logical block addressing (LBA) may be employed.

If the first parity management unit 63a has succeeded in generating parity (step S7), the process moves to step S9, in which the first parity management unit 63a writes the parity to the invalid parity area Ap. Then, in step S10, the first parity management unit 63a determines whether it has succeeded in writing the parity to the parity area Ap. If it has failed to write the parity to the parity area AP (step S10), the process moves to step S8.

If the first parity management unit 63a has succeeded in writing the parity to the parity area Ap (step S10), the process moves to step S11, in which the first parity management unit 63a records in the nonvolatile memory 90 that the parity area Ap is valid, and the process moves to step S1. If the parity area Ap is valid, when a read error occurs in the data area Ad, data in the data area Ad can be reconstructed (recovered, corrected, saved or error-corrected). Thus, a read error can be prevented from occurring in the data area Ad.

The magnetic disk device 1 and the method of managing parity according to one embodiment and configured as described above allow the MPU 60 to generate parity based on data in a data area Ad and write the parity to a parity area Ap if the parity area Ap is detected as an invalid one. Since the parity can be used to reconstruct the data in the data area Ad, a read error can be prevented from occurring in the data area Ad.

The MPU 60 can process a command received from the host 100 in preference to search for an invalid parity area. The MPU 60 can search for an invalid parity area in a background process. The MPU 60 neither search for an invalid parity area nor generate parity with an unexecuted command remaining. The MPU 60 can thus generate and write parity without adversely affecting the process of commands received from the host 100.

From the above, the magnetic disk device 1 and method of managing parity capable of generating parity without interfering with the process of received commands can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, when a plurality of parity areas Ap to be searched are prioritized, the first parity management unit 63a may consider the number of read retries, not the number of writes. For example, the counter 64 can count the number of read retries for the disk DK. The counter 64 can count the number of read retries for a predetermined sector SCa of the disk DK and update the total number of retries for each sector SCa in the nonvolatile memory (storage section) 90.

The nonvolatile memory 90 can further store another reference count (second reference count).

If the first parity management unit 63a detects an invalid parity area Ap from the nonvolatile memory 90, it can determine whether the parity area Ap of a track Ta having the largest value obtained by dividing the total number of read retries by the second reference count is invalid.

If the first parity management unit 63a determines that the parity area Ap is valid, it further determines whether the parity area Ap of a track Ta having the next largest value obtained by dividing the total number of read retries by the second reference count is invalid.

If the first parity management section 63a determines that the parity area Ap is invalid, it preferentially detects the parity area Ap that is determined as an invalid parity area.

Alternatively, if a plurality of parity areas Ap to be searched are prioritized, the first parity management unit 63a may consider a third threshold value that differs from the number of writes and the number of read retries.

The technology described above may be applied to a shingled write magnetic recording (SMR) or shingled write recording (SWR) magnetic disk device and a hybrid recording magnetic disk device which selects conventional magnetic recording or shingled write magnetic recording. For example, in the hybrid recording magnetic disk device, the user data area U of the recording layer Y includes a shingled recording area on the innermost circumference side and a conventional recording area on the outermost circumference side of the shingled recording area. This conventional recording area is sometimes called a conventional zone and can be an area in which frequently rewritten data, such as a system file and metadata, are recorded.

What is claimed is:

1. A magnetic disk device comprising:
   a disk including a first track, the first track including a first data area in which first data is recorded and a first parity area for recording first parity that is used to reconstruct the first data in the first data area;
   a storage section which stores information indicating whether the first parity area is a valid parity area in which the first parity is recorded or an invalid parity area in which the first parity is not recorded;
   a first determination unit which determines presence or absence of an unexecuted command; and
   a first parity management unit which starts to search the storage section for the first parity area after the first determination unit determines that there is no unexecuted command for a specified period of time, generates the first parity based on the first data in the first data area if the first parity area is detected as the invalid parity area, and writes the first parity to the first parity area.

2. The magnetic disk device of claim 1, wherein:
   if the first parity management unit succeeds in generating the first parity and succeeds in writing the first parity to the first parity area, the first parity management unit updates the information in the storage section to information indicating that the first parity area is the valid parity area; and
   if the first parity management unit fails to generate the first parity and fails to write the first parity to the first parity area, the first parity management unit updates the information in the storage section to information indicating that the first parity area is not a target for search.

3. The magnetic disk device of claim 2, further comprising:
   a second parity management unit,
   wherein:
   when the first parity management unit updates the information in the storage section to information indicating that the first parity area is not a target for search, the second parity management unit writes parity to the first parity area; and
   if the second parity management unit succeeds in writing parity to the first parity area, the second parity management unit updates the information in the storage section to information indicating that the first parity area is a target for search.

4. The magnetic disk device of claim 2, further comprising:
   a write processing unit; and
   a second parity management unit,
   wherein
   if the first parity management unit updates the information in the storage section to information indicating that the first parity area is not a target for search and then the write processing unit writes second data to the first data area in response to a received write command, the second parity management unit:
   generates second parity based on the second data;
   writes the second parity to the first parity area; and
   updates the information in the storage section to information indicating that the first parity area is a target for search if the second parity management unit succeeds in writing the second parity to the first parity area.

5. The magnetic disk device of claim 4, wherein
   upon receipt of the write command, the write processing unit sequentially writes the second data to all the first data area.

6. The magnetic disk device of claim 1, further comprising:
   a counter which counts the number of writes to the disk, the counter counting the number of writes to sectors radially adjacent to a predetermined sector of the disk when written to the predetermined sector to update the total number of writes for each sector in the storage section;
   a second determination unit which determines whether the total number of writes exceeds a first reference count recorded in the storage section; and
   a refresh processing unit which reads target data of a target sector having the total number of writes exceeding the first reference count when the target sector is detected, rewrites the target data to the target sector, and resets the total number of writes of the target sector recorded in the storage section,
   wherein:
   the disk includes a plurality of tracks including the first track;
   each of the tracks includes a data area and a parity area;
   when detecting the invalid parity area from the storage section, the first parity management unit determines whether the parity area of a track having a largest value obtained by dividing the total number of writes by the first reference count is the invalid parity area;

when determining that the parity area is the valid parity area, the first parity management unit further determines whether the parity area of a track having a next largest value obtained by dividing the total number of writes by the first reference count is the invalid parity area; and when determining that the parity area is the invalid parity area, the first parity management unit detects the invalid parity area preferentially.

7. The magnetic disk device of claim 1, further comprising:

a counter which counts the number of retries of read from the disk, the counter counting the number of retries of read from a predetermined sector of the disk to update the total number of retries for each sector in the storage section, wherein:

the disk includes a plurality of tracks including the first track;

each of the tracks includes a data area and a parity area;

the storage section stores a second reference count;

when detecting the invalid parity area from the storage section, the first parity management unit determines whether the parity area of a track having a largest value obtained by dividing the total number of retries by the second reference count is the invalid parity area;

when determining that the parity area is the valid parity area, the first parity management unit further determines whether the parity area of a track having a next largest value obtained by dividing the total number of retries by the second reference count is the invalid parity area; and when determining that the parity area is the invalid parity area, the first parity management unit detects the invalid parity area preferentially.

8. The magnetic disk device of claim 1, further comprising:

a command processing unit, wherein:

the first determination unit periodically determines presence or absence of the unexecuted command after the first parity management unit starts to search the storage section for the first parity area; and if the first determination unit determines that there is the unexecuted command after the first parity management unit starts to search the storage section for the first parity area, the first parity management unit interrupts searching the storage section for the first parity area, and the command processing unit processes the unexecuted command in preference to the search by the first parity management unit.

9. The magnetic disk device of claim 1, further comprising:

a read processing unit; and an error correction unit, wherein if the read processing unit detects that a read error has occurred in the first data area of the disk, the error correction unit recovers the first data based on the first data in the first data area and the first parity in the first parity area, and writes the recovered first data to the first data area.

10. A method of managing parity applied to a magnetic disk device, the magnetic disk device comprising: a disk including a first track, the first track including a first data area in which first data is recorded and a first parity area for recording first parity that is used to reconstruct the first data in the first data area; and a storage section which stores information indicating whether the first parity area is a valid parity area in which the first parity is recorded or an invalid parity area in which the first parity is not recorded, the method comprising:

determining presence or absence of an unexecuted command; and starting to search the storage section for the first parity area after it is determined that there is no unexecuted command for a specified period of time, generating the first parity based on the first data in the first data area if the first parity area is detected as the invalid parity area, and writing the first parity to the first parity area.

* * * * *